United States Patent [19]

Hoffmann et al.

[11] Patent Number: 5,263,562
[45] Date of Patent: Nov. 23, 1993

[54] CARBON BRUSH FOR COLLECTOR

[75] Inventors: Peter Hoffmann, Steeg; Johann Hoell, Hallstatt; Herbert Grabner; Klaus Reiser, both of Bad Ischl, all of Austria

[73] Assignee: Hoffman & Co. Elektrokohle Gesellschaft m.b.H, Steeg, Austria

[21] Appl. No.: 634,155

[22] PCT Filed: Jun. 23, 1989

[86] PCT No.: PCT/EP89/00708

§ 371 Date: Dec. 11, 1990

§ 102(e) Date: Dec. 11, 1990

[87] PCT Pub. No.: WO89/12559

PCT Pub. Date: Dec. 28, 1989

[30] Foreign Application Priority Data

Jun. 23, 1988 [DE] Fed. Rep. of Germany ....... 3921253

[51] Int. Cl.$^5$ ................. B60L 5/08; H01R 39/26
[52] U.S. Cl. ..................... 191/45 R; 310/249; 191/59.1
[58] Field of Search ............ 191/45 R, 47, 49, 50, 191/59, 59.1; 310/248-253

[56] References Cited

U.S. PATENT DOCUMENTS

| 1,835,011 | 12/1931 | Burr | 310/249 X |
| 2,092,627 | 9/1937 | Adams | 310/249 |
| 2,098,062 | 11/1937 | Palmer | 310/249 |
| 2,631,252 | 3/1953 | Falcettoni | 310/249 |
| 3,064,151 | 11/1962 | Rusynyk | 310/249 |
| 3,076,908 | 2/1963 | Pfaender | 310/249 |
| 3,601,645 | 8/1971 | Whiteheart | 310/249 X |
| 5,152,380 | 10/1992 | Hoffmann et al. | 191/49 |
| 5,193,656 | 3/1993 | Hoffmann et al. | 191/49 |

FOREIGN PATENT DOCUMENTS

| 697808 | 10/1940 | Fed. Rep. of Germany . |
| 341188 | 11/1959 | Fed. Rep. of Germany ..... 191/59.1 |
| 2543081 | 4/1976 | Fed. Rep. of Germany ........ 191/59 |
| 3104146 | 1/1982 | Fed. Rep. of Germany ........ 191/50 |
| 0206114 | 1/1984 | Fed. Rep. of Germany ........ 191/59 |
| 0214095 | 10/1984 | Fed. Rep. of Germany ..... 191/59.1 |
| 8716985 | 3/1988 | Fed. Rep. of Germany . |
| 8803377 | 6/1988 | Fed. Rep. of Germany . |
| 5144703 | 11/1980 | Japan ..................... 191/49 |

Primary Examiner—Michael S. Huppert
Assistant Examiner—Scott L. Lowe
Attorney, Agent, or Firm—Towsend and Townsend Khourie and Crew

[57] ABSTRACT

A carbon brush for a collector has a recess which is filled with a layer of galvanically applied, copper plating, in which at least one longitudinal wire is provided as a connecting conductor, which is mechanically and electrically linked with the brush through being embedded in and completely surrounded by the copper layer.

5 Claims, 1 Drawing Sheet

CARBON BRUSH FOR COLLECTOR

BACKGROUND OF THE INVENTION

The invention relates to the manner in which an electrical lead which extends over the length of a carbon brush is attached to the brush.

In a conventional carbon brush known from German utility model 8,716,985 the connecting lead is formed as a strip of woven metal fabric or metal foil which is secured to the brush by mechanically clamping it in a dovetailed recess of the brush. The lead is mechanically and electrically connected to the carbon brush, in part by clamping it in the recess, and in part by a galvanically applied metal layer which overlays the lead. However, the strength of the connection between the lead and the brush is dependent on production tolerances. These may fluctuate over the length of the brush, thus rendering it difficult to obtain precise values for the strength of the mechanical connection and the resistance of the electrical connection.

German patent publication DE-OS 34 05 674 discloses a carbon brush which has a metallic plating that coats the underside or a groove in the underside of the brush. The lead, in the form of a strip of woven metallic fabric or a metal foil, is soldered to the plating on the underside of the brush. Soldering involves, however, an additional manufacturing step. Moreover, the soldering temperature produces stresses between the metallic layer and the underside of the carbon brush as a result of differing rates of thermal expansion. This can lead to a separation of the metallic layer.

SUMMARY OF THE INVENTION

An object of the present invention is therefore to develop a carbon brush of the aforementioned kind which has an improved electrical and mechanical connection for the lead of the brush.

In accordance with the present invention the electric lead is not clamped into a recess in the carbon brush, but rather is embedded in a metallic plating which fills the recess. This offers not only the advantage of an improved mechanical and electrical connection between the lead and the carbon brush, it also eliminates the need to conform the shape of the lead to the shape of the recess, and the need for special pressure-applying tools for clamping the lead in place. It is not necessary to construct the lead in the form of a strip of metallic fabric or foil. Instead, the lead may be a single wire or multiple wires.

BRIEF DESCRIPTION OF THE DRAWINGS

Two embodiments of a carbon brush constructed according to the present invention are shown in cross-section in the drawings.

DESCRIPTION OF THE PREFERRED EMBODIMENTS

Figure 1:
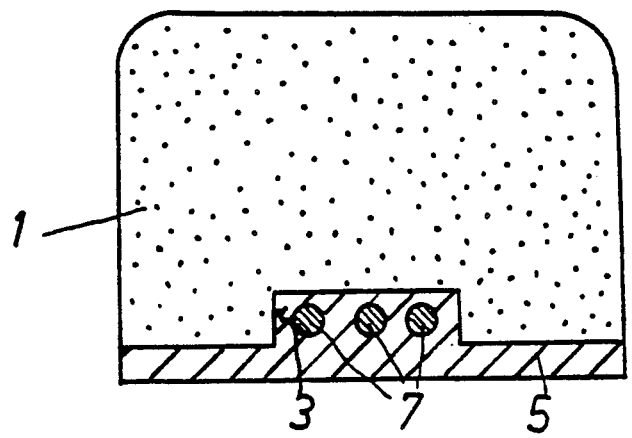
FIG. 1 is a side elevational cross-section through a carbon brush constructed in accordance with the present invention and illustrates how the electrical leads are attached to the brush by electrical plating.

FIG. 1 shows a carbon brush 1 with a recess 3 on its underside together with metal plating 5, preferably of copper. The metal plating completely fills recess 3. Wires 7 are imbedded in metal plating 5 in the area of recess 3. Wires 7 together with metal plating 5 define a current path in the longitudinal direction of carbon brush 1.

Figure 2:
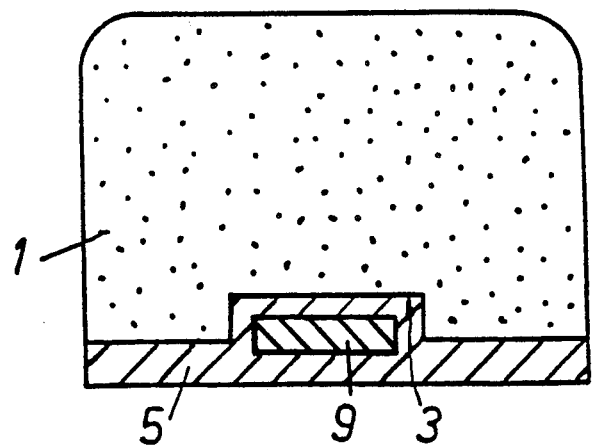
FIG. 2 is an elevational view, in section, similar to FIG. 1 and illustrates another embodiment of the present invention.

FIG. 2 shows a woven metal fabric strip 9 which is disposed in recess 3 of carbon brush 1. It is held in place not by being clamped in place, but rather by being embedded in metal plating 5.

The production of a carbon brush in accordance with the present invention requires a first plating step during which a layer of copper is plated over the inner surfaces of a recess, which was previously formed by milling or during press molding of the brush. Next the lead, in the form of one or multiple copper wires or a copper strip 9, is placed into the recess. During a second plating step the underside of the carbon brush and the lead are coated with a second layer of copper so that it bonds with the first layer of copper and fully embeds or envelops the lead.

The carbon brush of the present invention may be supported over its length in a conventional manner with a support. At least one end of the support includes an electrical connector which is mechanically attached and/or soldered directly onto metallic layer 5 and/or wires 7 or metal strip 9. The carbon brush of the present invention is particularly well suited for use with a support made partially or entirely of plastic.

What is claimed is:

1. A carbon brush for a current collector comprising an elongated carbon brush having a longitudinal recess extending along an under side of the brush, an elongated electrical lead located in said recess and extending along the length of the carbon brush, and a copper plating galvanically applied to the under side of the brush, said copper plating filling the recess and completely embedding and surrounding the electrical lead in the recess for mechanically and electrically securing the lead to the carbon brush along the length thereof.

2. A carbon brush according to claim 1 wherein the lead comprises multiple conductors.

3. A carbon brush according to claim 1 wherein the lead comprises a single conductor.

4. A carbon brush for an electrical current collector comprising an elongated carbon brush with a longitudinal recess extending over the length of the carbon brush and formed in an under side thereof, an electrical lead completely disposed inside the recess and extending in the recess over substantially its full length, and a copper layer galvanically applied to the under side, filling the recess, completely embedding the lead in the copper layer and forming a sole mechanical and electrical connection between the carbon brush and the lead.

5. A method for manufacturing a carbon brush for a collector, the brush being elongated and including an under side defining a recess extending substantially over the full length thereof, the method comprising the steps of first electroplating a copper layer over surfaces of the brush defining the recess; thereafter placing at least one elongated conductor completely inside and so that is extends over substantially the full length of the recess; and thereafter electroplating a further layer of copper while maintaining the lead in the recess, the electroplating step including the steps of fully embedding the lead in the further copper layer and simultaneously bonding the further layer to the first applied layer so that electroplated copper forms the sole electrical and mechanical connection of the lead to the brush.

* * * * *